(12) United States Patent
Corona (10) Patent No.: US 7,755,788 B2
(45) Date of Patent: Jul. 13, 2010

(54) SYSTEM AND METHOD OF SCANNING A JOB TO A GROUP OF PRINTERS FROM A MULTI-FUNCTION PERIPHERAL DEVICE

(75) Inventor: Fatima Corona, Long Beach, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1370 days.

(21) Appl. No.: 11/203,614

(22) Filed: Aug. 12, 2005

(65) Prior Publication Data

US 2007/0035765 A1 Feb. 15, 2007

(51) Int. Cl.
*G06F 15/00* (2006.01)
(52) U.S. Cl. .................................. 358/1.15; 358/1.6
(58) Field of Classification Search ................ 358/1.15, 358/1.6, 1.9, 1.16, 505, 474, 408, 405, 438, 358/439, 440, 443; 379/100.01, 100.06, 379/100.09, 100.12
See application file for complete search history.

(56) References Cited

U.S. PATENT DOCUMENTS

2002/0012046 A1* 1/2002 Ishino ........................ 348/96
2004/0036914 A1* 2/2004 Kropf et al. ................. 358/1.18
2005/0286080 A1* 12/2005 Lee et al. .................... 358/1.15
2006/0140698 A1* 6/2006 Nishi .......................... 400/62
2006/0215218 A1* 9/2006 Ujigawa ..................... 358/1.15

FOREIGN PATENT DOCUMENTS

JP 2003091398 * 3/2009

* cited by examiner

*Primary Examiner*—Jerome Grant, II
(74) *Attorney, Agent, or Firm*—Knobbe Martens Olson & Bear LLP (57) ABSTRACT

A system and method, for communicating data between a multi-function peripheral (MFP) device and a plurality of networked printing entities, is disclosed. In one embodiment, the method comprises selecting, at an MFP device, a plurality of networked printing entities, wherein information associated with printing, being compatible with the MFP device, is stored on the MFP device, and wherein the print associated information includes at least a location data of each of the selected printing entities. The method also comprises i) receiving, at the MFP device, a single print request for a document to be printed in the selected printing entities, and ii) sending the single print request to the selected printing entities based on the location data and the print associated information such that a copy of the same document is printed in all selected printing entities. In one embodiment, each of the plurality of networked printing entities includes one of the following: a single printer, a group of printers including at least one printer, and the combination thereof.

31 Claims, 6 Drawing Sheets

| Group of Printers | IP Address | Support Language | Printer Driver |
|---|---|---|---|
| Printer A | 105.267.26.0 | Postscript | Yes |
| Printer B | 105.64.203.89 | PCL | No |
| Printer C | 205.75.1.29 | Postscript | No |
| ... | ... | ... | ... |

FIG. 7

SYSTEM AND METHOD OF SCANNING A JOB TO A GROUP OF PRINTERS FROM A MULTI-FUNCTION PERIPHERAL DEVICE

BACKGROUND OF THE INVENTION

1. Field of the Invention

This invention relates to a multi-function peripheral device, and particularly to a system and method of communicating data between a multi-function peripheral device and a plurality of network printing entities.

2. Description of the Related Technology

Recently, multi-function peripheral (MFP) devices (or "all in one" devices), which have multiple functions, have been widely used. Typically, MFP devices can act as a printer, a scanner, a fax machine and a photocopier. These devices are becoming a popular option for small office/home office (SOHO) users because they are less expensive than buying three or four separate devices. MFP devices are also known as multifunction printers.

Most MFP devices can be used as standalone devices for faxing and copying. However, in many situations, they are connected to a computer and/or a network to provide various functions such as color scannings, page printing, scanning and emailing, and additional fax management options.

SUMMARY OF CERTAIN INVENTIVE ASPECTS OF THE INVENTION

One aspect of the invention provides a method of communicating data between a multi-function peripheral (MFP) device and a plurality of networked printing entities. In one embodiment, the method comprises: i) selecting, at an MFP device, a plurality of network printing entities, wherein information associated with printing, being compatible with the MFP device, is stored on the MFP device, and wherein the print associated information includes at least location data of each of the selected printing entities, ii) receiving, at the MFP device, a single print request for a document to be printed in the selected printing entities, and iii) sending the single printing request to the selected printing entities based on the location data and the print associated information such that a copy of the same document is printed in all selected printing entities.

Another aspect of the invention provides a method of communicating data between a multi-function peripheral (MFP) device and a plurality of networked printing entities. In one embodiment, the method comprises: i) selecting, at an MFP device, a plurality of network printing entities, wherein information associated with printing, being compatible with the MFP device, is stored on the MFP device, and wherein the print associated information includes at least location data and a supporting language of each of the selected printing entities, ii) scanning, at the MFP device, a document to be printed in the selected printing entities, iii) converting the scanned data into the respective supporting language of each selected printing entity based on the print associated information, and iv) sending the converted data to the selected printing entities based on the location data such that a copy of the same document is printed in all selected printing entities.

Another aspect of the invention provides a method of communicating data between a multi-function peripheral (MFP) device and a plurality of networked printing entities. In one embodiment, the method comprises: i) receiving, from an external computing device, information associated with printing for a plurality of network printing entities, wherein the print associated information, being compatible with an MFP device, includes at least location data and a supported language of each printing entity, ii) storing the print associated information on the MFP device, iii) selecting at least two of the plurality of network printing entities, iv) scanning a document to be printed in the selected printing entities, and v) determining, at the MFP device, whether a selected printing entity has an accessible printer driver. The method also comprises vi) if it is determined that the selected printing entity has an accessible printer driver, transmitting the scanned document to an external computing device and requesting that the printer driver convert the scanned document into the respective supporting language of each selected printing entity, and send it to the selected printing entity, vii) if it is determined that the selected printing entity does not have an accessible printer driver, converting, at the MFP device, the scanned data into the respective supporting language of each selected printing entity, without a printer driver, based on the print associated information, and viii) sending, at the MFP device, the converted data to each selected printing entity, which does not have an accessible printer driver, based on the location data such that a copy of the same document is printed in each selected printing entity without the printer driver.

Still another aspect of the invention provides a system for communicating data between a multi-function peripheral (MFP) device and a plurality of networked printing entities. In one embodiment, the system comprises an MFP device configured to: i) select a plurality of network printing entities, wherein information associated with printing, being compatible with the MFP device, is stored on the MFP device, and wherein the print associated information includes at least location data of each of the selected printing entities, and ii) receive a single print request for a document to be printed in the selected printing entities. The system is configured to send the single printing request to the selected printing entities based on the location data and the print associated information such that a copy of the same document is printed at all selected printing entities.

Still another aspect of the invention provides a multi-function peripheral (MFP) device for communicating data with a plurality of network printing entities. In one embodiment, the MFP device comprises i) a first module configured to select a plurality of network printing entities, wherein information associated with printing, being compatible with an MFP device, is stored on the MFP device, and wherein the print associated information includes at least location data and a supported language for each of the selected printing entities, ii) a second module configured to scan a document to be printed in the selected printing entities, iii) a third module configured to convert the scanned data into the respective supporting language of each selected printing entity based on the print associated information, and iv) a fourth module configured to send the converted data to the selected printing entities based on the location data such that a copy of the same document is printed in all selected printing entities.

Yet another aspect of the invention provides a multi-function peripheral (MFP) device configured to create, modify and store address and printer language identification information for a group of networked printer devices and; upon user request to send a scanned image to the group according to the stored information including preparing the scanned image in each specified language so as to be properly interpreted and printed by each printer device in the group.

BRIEF DESCRIPTION OF THE DRAWINGS

The foregoing and other features of the invention will become more fully apparent from the following description and appended claims taken in conjunction with the following drawings, in which like reference numerals indicate identical or functionally similar elements.

DETAILED DESCRIPTION OF CERTAIN EMBODIMENTS OF THE INVENTION

Figure 1:
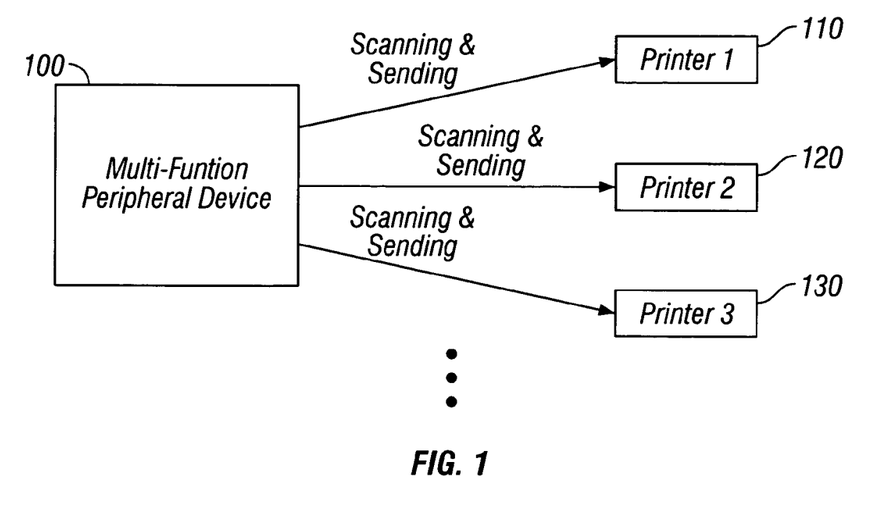
FIG. 1 illustrates a typical MFP device which scans and sends a document for printing to a plurality of network printers.

FIG. 1 illustrates a typical MFP device which scans and sends a document for printing to a plurality of network printers. In FIG. 1, in order for a user to send a scanned document to a plurality of printers 110-130 (only three printers are illustrated for convenience) using the MFP device 100, one scans the document and sends it to a first printer 110. Then, the user scans the document and sends it to a second printer 120. For a third printer 130, the user repeats the scanning and sending steps.

That is, if the user wishes to send a print job, at the MFP device 100, to more than one network printer, after sending the print job (scanned document) to the first printer, the user will need to repeat the same steps (scanning and sending) for all the other printers. Thus, there has been a desire that a user can send a single print job, at an MFP device, to a plurality of network printers to have the print job completed in all of the printers.

One aspect of the invention provides a system and method of sending a single print request for a document, at an MFP device, to a plurality of network printers such that the sent document is printed at all of the selected network printers based on the single print job request.

Figure 2:
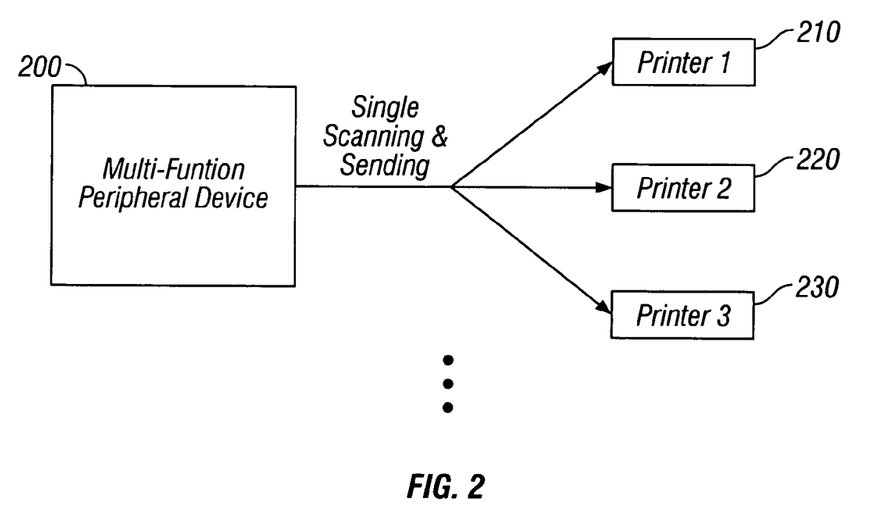
FIG. 2 illustrates a conceptual diagram of a system for sending, at an MFP device, a single print request for a document to a plurality of network printers according to one embodiment of the invention.

FIG. 2 illustrates a conceptual diagram of a system for sending, at an MFP device, a single print request for a document to a plurality of printers according to one embodiment of the invention. In one embodiment, the MFP device 200 stores information associated with printing for each of a plurality of network printers 210-230, being in data communication with the MFP device 200. In this embodiment, the print associated information is compatible with the MFP device 200, which means that the MFP device 200 can communicate data with the network printers 210-230 based on the print associated information.

In one embodiment, each of the printers 210-230 includes any printing entity including, by way of example, a multifunction peripheral printer (either color or monochrome MFP printer). In one embodiment, each printing entity includes one of the following: a single printer, a group of printers (will be described later) including at least one printer, and the combination thereof.

In one embodiment, the print associated information includes i) printer identification data such as a single printer or group name (will be described later), ii) the location data of a printer such as an IP address or hostname and ii) printer language that the printer can support. In another embodiment, the print associated information further includes information regarding whether the printer has an accessible printer driver.

In one embodiment, for all selected printers 210-230, the MFP device 200 converts printing data (e.g., scanned document) to a specific language, based on the print associated information, which each printer 210-230 can understand, and sends the converted data to each printer 210-230 which will print the received data. In another embodiment, the MFP device 200 forwards the scanned document to an external computing device (not shown in FIG. 2), where a printer driver of a selected printer is located. In this embodiment, the external computing device instructs the printer driver to convert the received data to a particular printer language for the selected printer, and sends it to the printer. In the above embodiments, with a user's single print request for a document (single scanning and sending), the document can be printed in all selected network printers.

Figure 3:
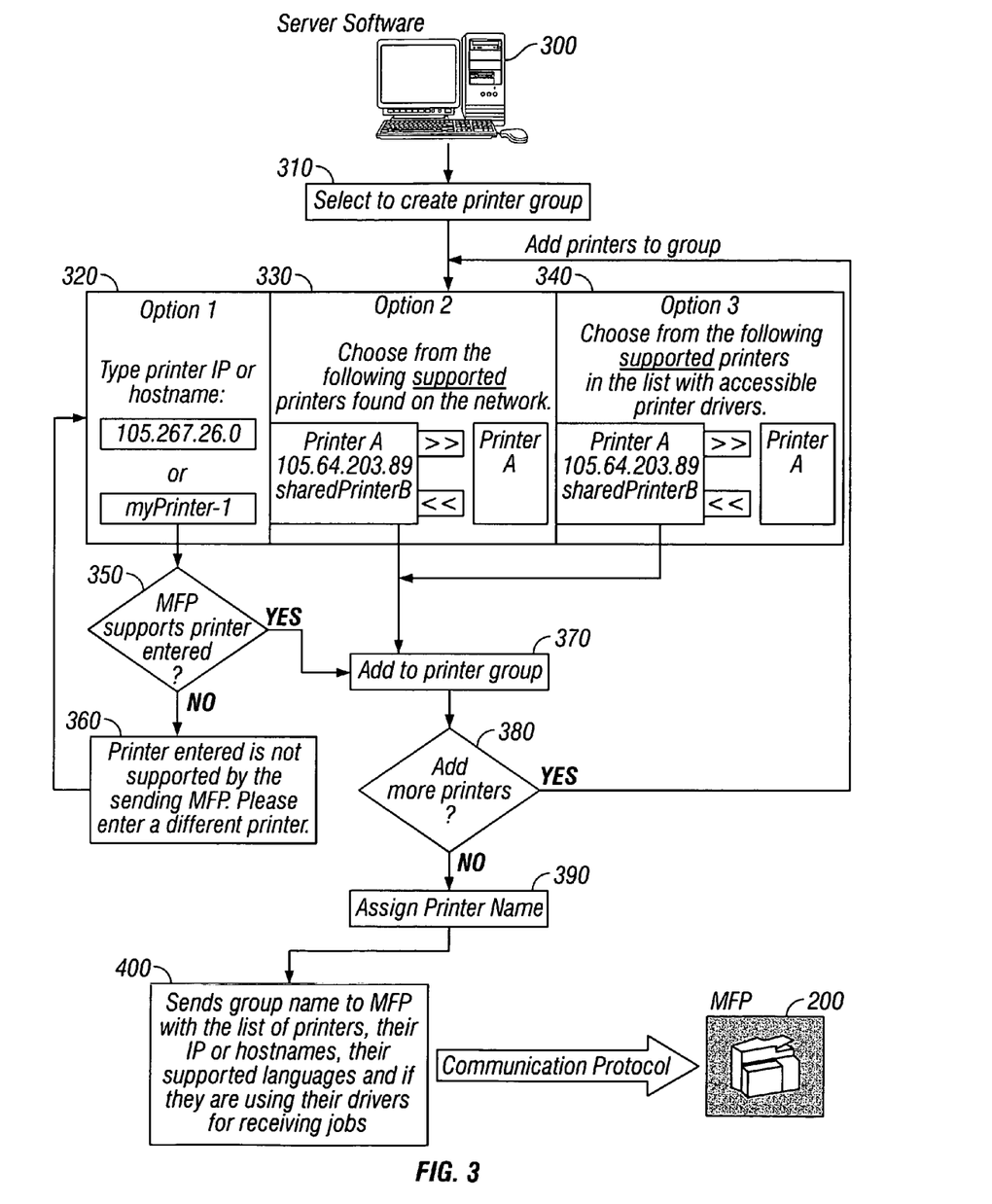
FIG. 3 illustrates an exemplary flowchart which shows creating print associated information to be downloaded to the MFP device according to one embodiment of the invention.
Figure 5:
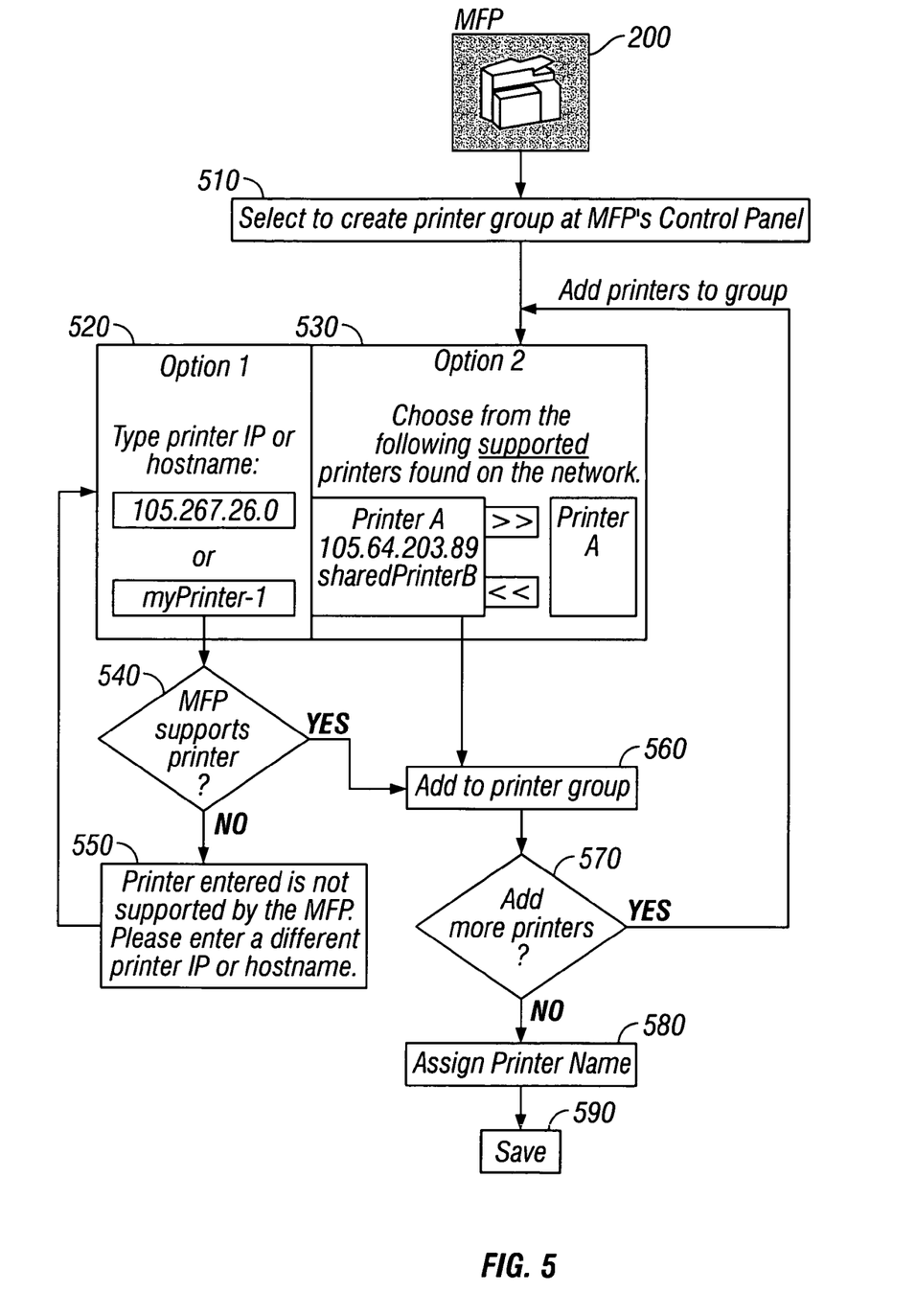
FIG. 5 illustrates an exemplary flowchart which shows creating the print associated information to be stored on the MFP device according to another embodiment of the invention.

In one embodiment, the MFP device 200 can download the print associated information from a server computer or an external computing device which does not belong to the MFP device 200 as illustrated in FIG. 3. In still another embodiment, the print associated information can be generated at the MFP device 200 as illustrated in FIG. 5.

In the embodiment where the print associated information is downloaded to the MFP device 200, the computing device (server computer) 300 is in data communication with the MFP device 200 with the use of either a known (public) communication protocol, for example, TCP/IP, or a proprietary communication protocol. In one embodiment, the MFP device 200 includes an SCX-6320F available from Samsung Electronics.

FIGS. 3-6 illustrate exemplary flowcharts for explaining a method of sending, at an MFP device, a single print request for a document to a plurality of network printers according to embodiments of the invention. In one embodiment, the procedures are implemented in a network system where the MFP device 200 is in data communication with a server computer or an external computing device 300.

In one embodiment, each of the printing procedures illustrated in FIGS. 3-6 is implemented in a conventional programming language, such as C or C++ or another suitable programming language. In one embodiment of the invention, the program is stored on a computer accessible storage medium of at least one of the MFP device 200 and the external computing device 300. In another embodiment, the program can be stored in other system locations so long as it can perform the single job printing procedures according to embodiments of the invention. The storage medium may comprise any of a variety of technologies for storing information. In one embodiment, the storage medium comprises a random access memory (RAM), hard disks, floppy disks, digital video devices, compact discs, video discs, and/or other optical storage mediums, etc.

In another embodiment, at least one of the MFP device 200 and the computing device 300 comprises a processor (not shown) configured to or programmed to perform the inventive printing procedures. The program may be stored in the processor or a memory of the MFP device 200 or the computing device 300. In various embodiments, the processor may have a configuration based on Intel Corporation's family of microprocessors, such as the Pentium family and Microsoft Corporation's windows operating systems such as WINDOWS 95, WINDOWS 98, WINDOWS 2000 or WINDOWS NT. In one embodiment, the processor is implemented with a variety of computer platforms using a single chip or multichip microprocessors, digital signal processors, embedded microprocessors, microcontrollers, etc. In another embodiment, the processor is implemented with a wide range of operating systems such as Unix, Linux, Microsoft DOS, Microsoft Windows 2000/9x/ME/XP, Macintosh OS, OS/2 and the like. In another embodiment, the printing procedures can be implemented with embedded software.

FIG. 3 illustrates an exemplary flowchart which shows creating print associated information (hereinafter will be referred to "set-up procedure" for convenience) to be downloaded to the MFP device 200 according to one embodiment of the invention. In one embodiment as shown in FIG. 3, the set-up procedure is performed by server software or software stored in the computing device 300. In this embodiment, the computing device 300 includes any computing device which hosts the software and does not belong to the MFP device 200. Examples of such a computing device 300 are a user PC, a server computer or a management computer, which can communicate data with the MFP device 200 with the use of a public communication standard or a proprietary protocol. In one embodiment, the set-up procedure results can be downloaded to the MFP device 200.

In FIG. 3, depending on circumstances, additional states may be added, others removed, or the order of the states changes. Furthermore, more than two states can be combined into one state. The same applies to FIGS. 4-6.

A user selects the function to create a printer group at the computing device 300 (310) where the server software or software, for performing the set-up procedure, is run. In this state, network printers are added to a printer group by the user. In one embodiment, as shown in FIG. 3, the user creates a group of network printers, with the use of three options (320-340). In one embodiment, the group of network printers may include all competitive products, in addition to in-house developed printers and any MFP printers. In one embodiment, each group includes at least one individual printer.

In state 320 (option 1), the user is prompted to enter (type in) the IP address or hostname of a printer that he wants to add. The IP address of a printer is exemplified as "105.267.26.0" and the hostname of the printer is exemplified as "myPrinter-1" in state 320. The hostname of a printer is a name of the printer which is assigned a certain IP address. The hostname and the corresponding IP address of a printer are oftentimes used interchangeably to refer to the same network device.

The computing device 300 checks if the MFP device 200 supports the printer which the user entered, in terms of, for example, a printing language (350). For example, in case the MFP device 200 can only support PostScript or Pinter Control Language (PCL), if the provided printer is not compatible with either PCL or PostSript, the computing device 300 indicates that the entered printer is not supported by the MFP 200 and requests that the user enter a different printer (360). In one embodiment, the MFP device 200 sends the entered printer a certain data item (for example, a simple inquiry) in a certain printer language, for example, PCL. In this embodiment, if the printer replies to the MFP device 200, the MFP device confirms that the printer can understand PCL.

Thereafter, the states 320, 350 and 360 can be repeated as desired or in a predetermined number of times preset by, for example, the MFP device 200 or the computing device 300. If it is determined that the entered printer is compatible with the MFP device 200, the entered printer is added to a printer group (370) or to the MFP device 200 without having a printer group assigned.

In state 330 (option 2), the user is prompted to select printers from a list of all available network printers. In one embodiment, the user can select a printer by clicking the hostname or IP address of the printer, and cancel the selection by clicking again the selected printer. In this embodiment, all listed printers are known to be compatible with the MFP device 200. In one embodiment, those printers on the list communicate data with the computing device 300 hosting the server software (set-up procedure), however, the computing device 300 does not have printer drivers for any of those listed printers.

In state 340 (option 3), the user is asked to select printers from a list of all available network printers. In one embodiment, the user can select and cancel a printer in the same way as in the state 330. In this embodiment, all printers of the list are compatible with the MFP device 200. In one embodiment, the computing device 300, hosting the server software, has printer drivers for all of those listed printers.

The user adds more selected (supported) printers to the printer group by repeating the above states 320-380 (390). The user then assigns a name to the printer group (390). In one embodiment, the computing device 300 may add a plurality of network printers without assigning a printer group. In that embodiment, the state 390 can be omitted The computing device 300 sends the printer group information (or print associated information) to the MFP device 200 (400). The print associated information is exemplified in FIG. 7. As discussed above, in one embodiment, the print associated information includes i) the list of the printers of the group, and ii) supported printer language (400). In another embodiment, the print associated information can include i) a group name, if the group name is assigned to added printers, and/or ii) an individual printer name. In another embodiment, the print associated information further includes information regarding whether selected printers have accessible printer drivers.

Figure 7:
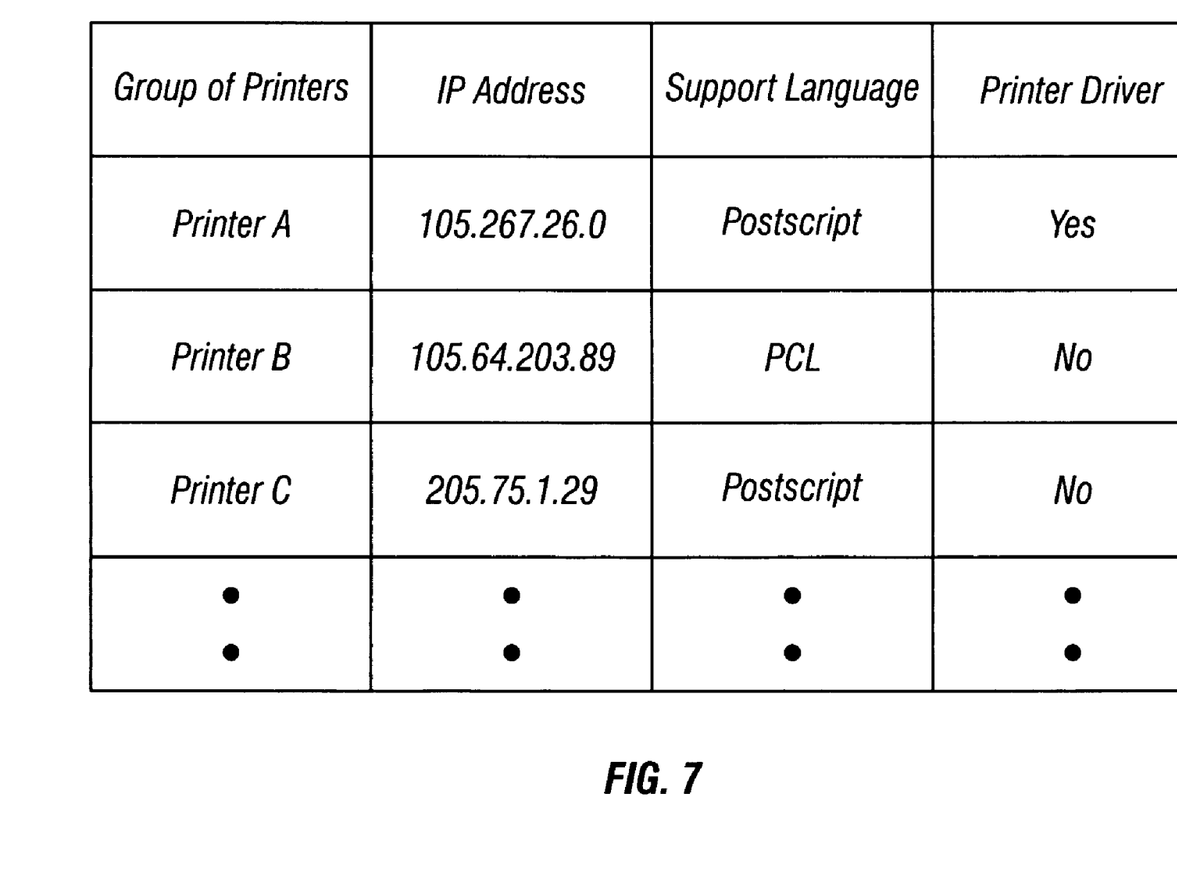
FIG. 7 illustrates an exemplary format of print associated information according to one embodiment of the invention.

In the embodiment (for example, option 3) where printers have accessible printer drivers, the information has a format as shown in FIG. 7. In the embodiment where printers do not have accessible printer drivers, the print associated information does not include information regarding whether printers have accessible printer drivers or not.

In one embodiment, the print associated information can include only a single group of printers as illustrated in FIG. 7. In another embodiment, a plurality of printer groups can be created. In one embodiment, the user can be provided an option to add printers to an existing group until a preset maximum number of printers is reached in the group. In this embodiment, the preset maximum number can be regulated by an organization. In another embodiment, the user can be provided an option to start a new group at any time during the adding process. In one embodiment, all printers, which are used by the same department (for example, an accounting department or administrative department) of an organization, may be included in the same printer group. In another embodiment, all printers, which use the same printer language, may be included in the same printer group. In one embodiment, a printer group can include only one individual printer or multiple printers.

Figure 4:
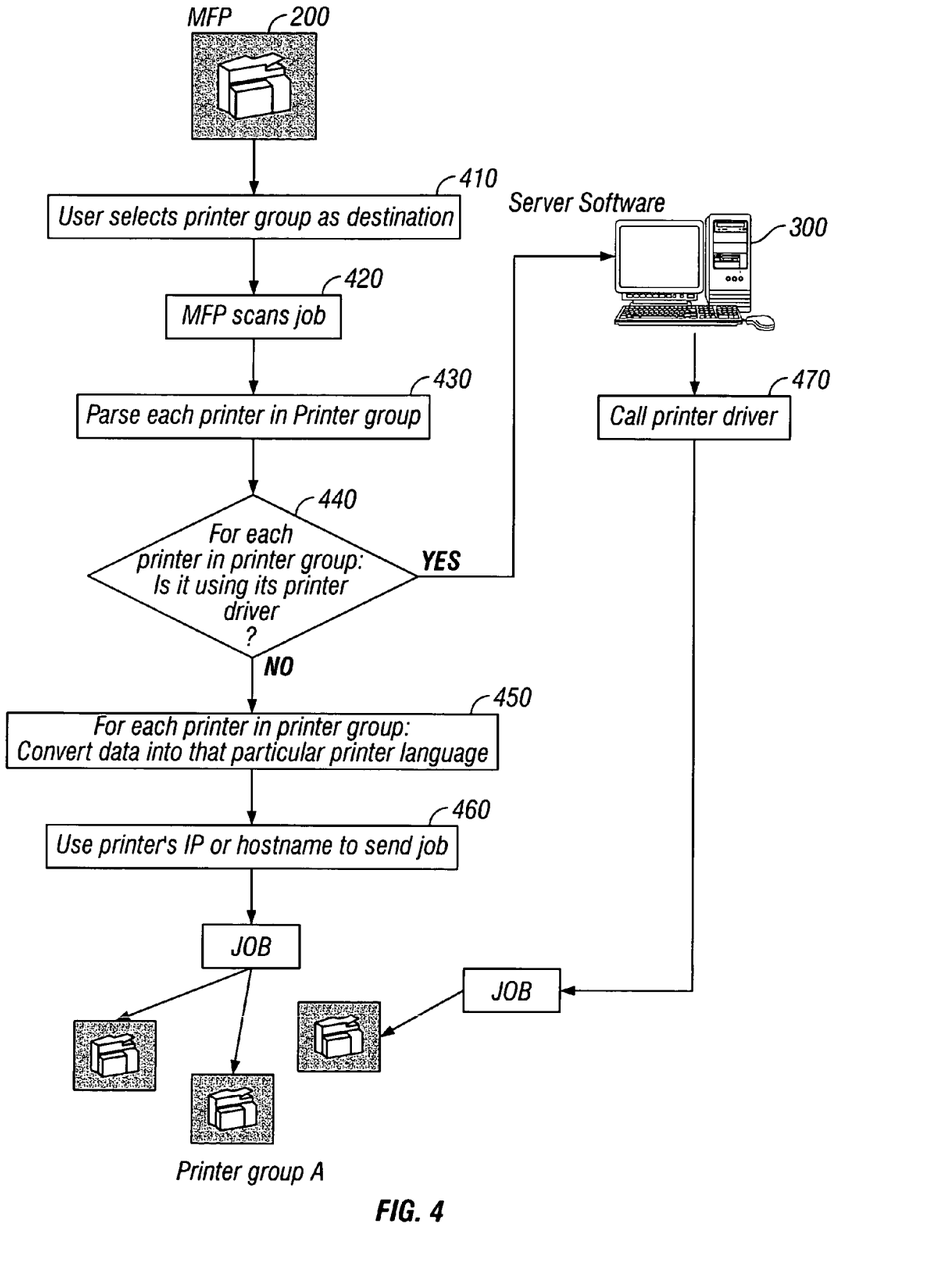
FIG. 4 illustrates an exemplary flowchart for explaining a method of sending, at an MFP device, a single print request for a document to a plurality of network printers according to one embodiment of the invention.

FIG. 4 illustrates an exemplary flowchart for explaining a method of sending, at an MFP device, a single print request for a document to a plurality of printers according to one embodiment of the invention.

The MFP device 200 receives and saves the printer group information. In one embodiment, the MFP device 200 displays the name of the printer group on a menu option of the control panel so that the user can select printers from the menu option. The user selects a printer group destination for printing (410). In one embodiment, the MFP device 200 may select certain printers from a printer group rather than selecting all the printers of the group. When the user scans a document to be printed (420), the MFP device 200 parses individual printers in the printer group (430). In one embodiment, the MFP device 200 supports scanning using known standard file formats.

The MFP device 200 determines whether a selected printer of the group has an accessible printer driver or is using its own printer driver (440). For the printers which do not use their printer drivers, the MFP device 200 converts the scanned document to a particular printer language (for example, PCL or PostScript, etc.) supported by each individual printer based on the stored print associated information as shown in FIG. 7 (450). The MFP device 200 sends the print job (scanned document) to the selected printers based on their IP addresses or hostnames (460). The selected printers receive the print job and print the received document.

In state 440, for the printers which have accessible printer drivers, the MFP device 200 forwards the scanned copy to the computing device 300 where those printer drivers are located. In one embodiment, the computing device 300 requests that each of the printer drivers convert the scanned data to a supported printer language, which the selected printer can understand, and send the converted data to the selected printer for printing (470). In another embodiment, the states 440 and 470 being omitted, the MFP device 200 can directly convert the scanned data to a supported language, which the selected printer can understand, and send the converted data to the selected printers for printing.

In one embodiment, the printer drivers are located in the computing device 300 on which the server software is loaded. In another embodiment, the printer drivers can be installed in another computer (not shown) which is in data communication with the computing device 300 and the MFP device 200. In another embodiment, the printer drivers can be installed on the MFP device 200 assuming that the device 200 supports the ability to load printer drivers on the device itself (downloaded to it through some external mechanism or internal, or even by providing a hardware slot on the MFP device 200 to insert an external hardware device containing the printer driver information.

FIG. 5 illustrates an exemplary flowchart which shows creating the print associated information to be stored on the MFP device 200 according to another embodiment of the invention. In this embodiment, the software performing the set-up procedure is stored or embedded in the MFP device 200. The states 520 and 540-550 are the same as the states 320 and 350-360 of FIG. 3. Furthermore, the states 530 and 560-580 are the same as the states 330 and 370-390 of FIG. 3. Thus, the description thereof will be omitted.

In one embodiment, as shown in FIG. 5, the user is prompted to create a group of network printers, with the use of two options (520, 530). In one embodiment, where the software is distributed by an MFP vendor, the group of network printers may include, by way of example, all competitive products, in addition to in-house developed printers and any MFP printers, as long as they support the same language as the MFP device 200.

After assigning a printer group name (580), the MFP device 200 saves information regarding the created group of network printers (590). As discussed above, in this embodiment, the print associated information does not include information whether printers have an accessible printer driver.

Figure 6:
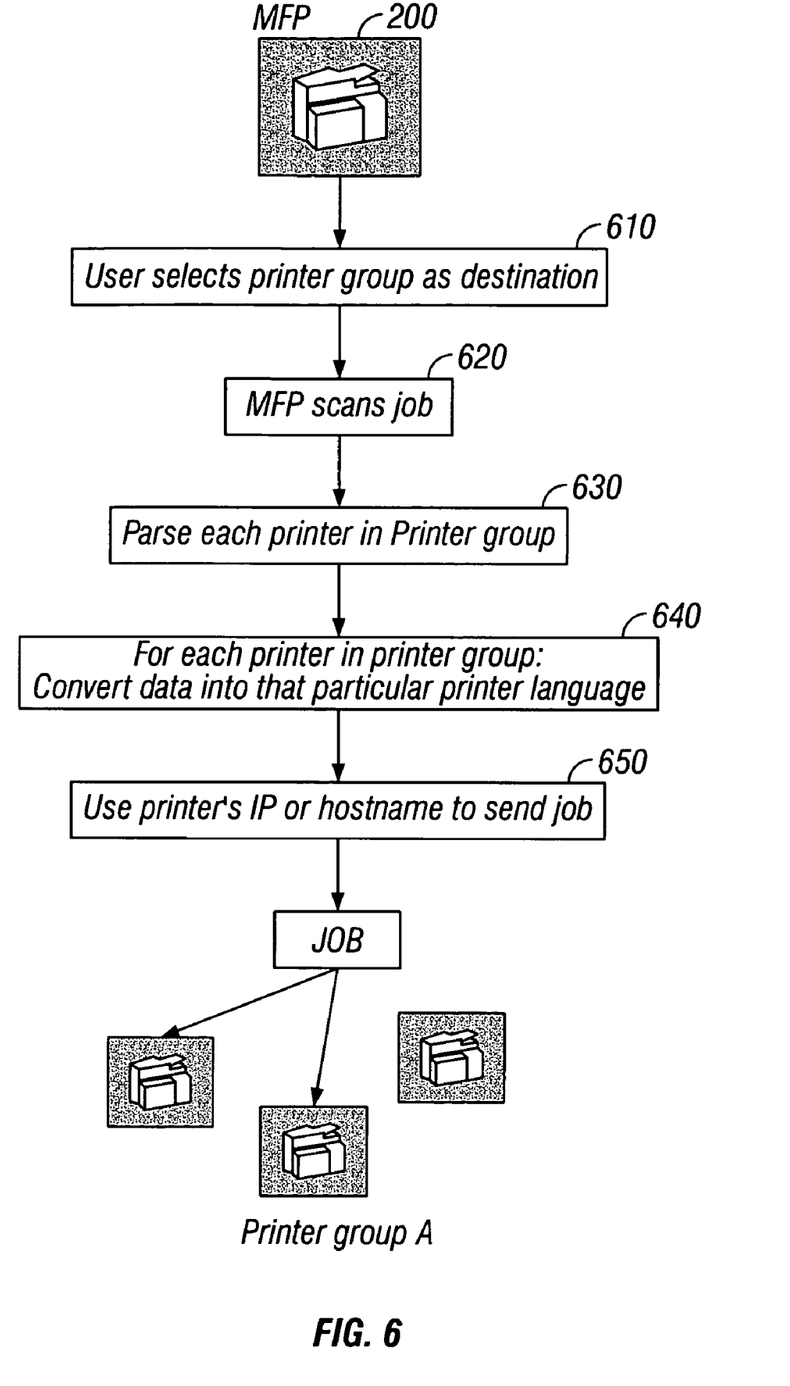
FIG. 6 illustrates an exemplary flowchart for explaining a method of sending, at an MFP device, a single print request for a document to a plurality of network printers according to another embodiment of the invention.

FIG. 6 illustrates an exemplary flowchart for explaining a method of sending, at an MFP device, a single print request for a document to a plurality of printers according to another embodiment of the invention. In this embodiment, since the set-up procedure is embedded in the MFP device 200, the device 200 does not need to communicate data with an external computing device compared to the embodiment shown in FIGS. 3 and 4. In this embodiment, for all selected printers, the MFP device 200 converts the scanned document into a particular printer language for a selected printer and sends the converted data to the printers such that the document is printed in all the selected printers. The states 610-650 are substantially the same as the states 410-430 and 450-460 of FIG. 4. Thus, the description thereof will be omitted.

According to embodiments of the invention, a user can select a plurality of network printers and send a single scanned document to the selected printers, such that the document is printed in all selected printers. Furthermore, for a group of printers which includes a plurality of individual printers, a copy of the same document is printed in all of the individual printers of the group by selecting only the group.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A method of communicating data between a multi-function peripheral (MFP) device and a plurality of networked printing entities, the method comprising:
   selecting, at an MFP device, a plurality of networked printing entities, wherein information associated with printing, being compatible with the MFP device, is stored on the MFP device, and wherein the print associated information includes at least location data of each of the selected printing entities;
   receiving, at the MFP device, a single print request for a document to be printed in the selected printing entities; and
   sending the single print request to the selected printing entities based on the location data and the print associated information such that a copy of the same document is printed in all selected printing entities.

2. The method of claim 1, wherein the print associated information further includes a supported printer language and information regarding whether each printer has an accessible printer driver.

3. The method of claim 1, wherein the location data includes the IP address or hostname of a printer.

4. The method of claim 1, further comprising:
   generating the print associated information in an external computing device; and
   downloading the generated print associated information to the MFP device.

5. The method of claim 4, further comprising determining, at the MFP device, whether a selected printer has an accessible printer driver.

6. The method of claim 5, wherein, if the selected printer has an accessible printer driver, the method further comprises forwarding the received document to the external computing device on which the printer driver is located, and requesting that the printer driver convert the received document into a printer language that is supported by the selected printer, and send the converted data to the selected printer.

7. The method of claim 5, wherein, if the selected printer does not have an accessible printer driver, the method further comprises converting, at the MFP device, the received document into a printer language that is supported by the selected printer, and sending the converted data to the selected printer.

8. The method of claim 1, wherein the sending is performed at the MFP device.

9. The method of claim 1, wherein each of the plurality of networked printing entities includes one of the following: a single printer, a group of printers including at least one printer, and the combination thereof.

10. The method of claim 9, wherein the print associated information further includes the names of each printer or printer group.

11. A method of communicating data between a multi-function peripheral (MFP) device and a plurality of networked printing entities, the method comprising:
   selecting, at an MFP device, a plurality of networked printing entities, wherein information associated with printing, being compatible with the MFP device, is stored on the MFP device, and wherein the print associated information includes at least location data and a supported printer language of each of the selected printing entities;
   scanning, at the MFP device, a document to be printed in the selected printing entities;
   converting the scanned data into the respective supported printer language of each selected printing entity based on the print associated information; and
   sending the converted data to the selected printing entities based on the location data such that a copy of the same document is printed in all selected printing entities.

12. The method of claim 11, wherein the sending is performed at the MFP device.

13. The method of claim 11, further comprising generating the print associated information at the MFP device.

14. The method of claim 11, wherein the location data includes the IP address or hostname of a printer.

15. The method of claim 11, wherein each of the plurality of networked printing entities includes one of the following: a single printer, a group of printers including at least one printer, and the combination thereof.

16. The method of claim 15, wherein the print associated information further includes the names of each printer or printer group.

17. A method of communicating data between a multi-function peripheral (MFP) device and a plurality of networked printing entities, the method comprising:
   receiving, from an external computing device, information associated with printing for a plurality of networked printing entities, wherein the print associated information, being compatible with an MFP device, includes at least location data and a supported printer language of each printing entity;
   storing the print associated information on the MFP device;
   selecting at least one of the plurality of networked printing entities;
   scanning a document to be printed in each selected printing entity;
   determining, at the MFP device, whether a selected printing entity has an accessible printer driver;
   if it is determined that the selected printing entity has an accessible printer driver, transmitting the scanned document to an external computing device and requesting that the printer driver convert the scanned document into the respective supported printer language of each selected printing entity, and send it to the selected printing entity;
   if it is determined that the selected printing entity does not have an accessible printer driver, converting, at the MFP device, the scanned data into the respective supporting language of each selected printing entity, without a printer driver, based on the print associated information; and
   sending, at the MFP device, the converted data to each selected printing entity, which does not have an accessible printer driver, based on the location data such that a copy of the same document is printed in each selected printing entity without the printer driver.

18. The method of claim 17, wherein each of the at least one selected printing entity includes one of the following: a single printer, a group of printers including at least one printer, and the combination thereof.

19. A system for communicating data between a multi-function peripheral (MFP) device and a plurality of networked printing entities, the system comprising:
   an MFP device configured to:
      i) select a plurality of networked printing entities, wherein information associated with printing, being compatible with the MFP device, is stored on the MFP device, and wherein the print associated information includes at least location data of each of the selected printing entities; and
      ii) receive a single print request for a document to be printed in the selected printing entities,
   wherein the system is configured to send the single print request to the selected printing entities based on the location data and the print associated information such that a copy of the same document is printed at all selected printing entities.

20. The system of claim 19, wherein the MFP device is configured to send the single print request to the selected printing entities.

21. The system of claim 19, further comprising an external computing device, being in data communication with the MFP device, configured to provide the print associated information to the MFP device.

22. The system of claim 21, wherein a selected printing entity has an accessible printer driver at the external computing device, and wherein the external computing device is configured to i) receive the printing document from the MFP device and ii) request that the printer driver convert the document into a supported printer language, which the selected printing entity can understand, and send the converted data to the selected printing entity.

23. The system of claim 19, wherein each of the plurality of networked printing entities includes one of the following: a single printer, a group of printers including at least one printer, and the combination thereof.

24. A multi-function peripheral (MFP) device for communicating data with a plurality of network printing entities, the MFP device comprising:
   a first module configured to select a plurality of networked printing entities, wherein information associated with printing, being compatible with an MFP device, is stored on the MFP device, and wherein the print associated information includes at least location data and a supported printer language for each of the selected printing entities;

a second module configured to scan a document to be printed in the selected printing entities;

a third module configured to convert the scanned data into the respective supported printer language of each selected printing entity based on the print associated information; and a fourth module configured to send the converted data to the selected printing entities based on the location data such that a copy of the same document is printed in all selected printing entities.

25. A multi-function peripheral (MFP) device configured to create, modify and store address and printer language identification information for a group of networked printer devices and, upon user request, to send a scanned image to the group according to the stored information including preparing the scanned image in each specified language so as to be properly interpreted and printed by each printer device in the group.

26. One or more processor readable storage devices having processor readable code embodied on the processor readable storage devices, the processor readable code for programming one or more processors to perform a method of communicating data between a multi-function peripheral (MFP) device and a plurality of networked printing entities, the method comprising:

selecting, at an MFP device, a plurality of networked printing entities, wherein information associated with printing, being compatible with the MFP device, is stored on the MFP device, and wherein the print associated information includes at least location data of each of the selected printing entities;

receiving, at the MFP device, a single print request for a document to be printed in the selected printing entities; and sending the single print request to the selected printing entities based on the location data and the print associated information such that a copy of the same document is printed in all selected printing entities.

27. A system for communicating data between a multi-function peripheral (MFP) device and a plurality of networked printing entities, the system comprising:

means for selecting, at an MFP device, a plurality of networked printing entities, wherein information associated with printing, being compatible with the MFP device, is stored on the MFP device, and wherein the print associated information includes at least location data of each of the selected printing entities;

means for receiving, at the MFP device, a single print request for a document to be printed in the selected printing entities; and means for sending the single print request to the selected printing entities based on the location data and the print associated information such that a copy of the same document is printed in all selected printing entities.

28. A method of communicating data between a multi-function peripheral (MFP) device and at least one networked printing entity, the method comprising:

selecting, at an MFP device, at least one networked printing entity, wherein information associated with printing, being compatible with the MFP device, is stored on the MFP device, and wherein the print associated information includes at least location data and a supported printer language of each selected printing entity;

scanning, at the MFP device, a document to be printed in each selected printing entity;

converting, at the MFP device, the scanned data into the respective supported printer language of each selected printing entity based on the print associated information; and sending the converted data to each selected printing entity based on the location data such that a copy of the same document is printed in all selected printing entity.

29. The method of claim 28, wherein each of the at least one networked printing entity includes one of the following: a single printer, a group of printers including at least one printer, and the combination thereof.

30. A method of communicating data between a multi-function peripheral (MFP) device and at least one networked printing entity, the method comprising:

storing, on an MFP device, information associated with printing, being compatible with the MFP device, for a plurality of networked printing entities, wherein the print associated information includes i) printing entity identification information, ii) location data and iii) a supported printer language of each of the plurality of networked printing entities;

selecting, at the MFP device, at least one of the plurality of networked printing entities, wherein each of the at least one selected printing entity includes one of the following: a single printer, a group of printers including at least one printer, and the combination thereof;

scanning, at the MFP device, a document to be printed in each selected printing entity;

converting the scanned data into the respective supported printer language of each selected printing entity based on the print associated information; and sending the converted data to each selected printing entity based on the location data such that a copy of the same document is printed in each selected printing entity.

31. The method of claim 30, wherein the at least one selected printing entity is a group of printers which includes a plurality of individual printers, wherein a copy of the same document is printed in all of the individual printers of the group by selecting only the group at the MFP device.

* * * * *